United States Patent [19]

Soodak

[11] Patent Number: 5,230,033

[45] Date of Patent: Jul. 20, 1993

[54] SUBMINIATURE FIBER OPTIC SUBMARINE CABLE AND METHOD OF MAKING

[75] Inventor: Charles I. Soodak, Silver Spring, Md.

[73] Assignee: Optelecom, Inc., Gaithersburg, Md.

[21] Appl. No.: 667,166

[22] Filed: Nov. 1, 1984

[51] Int. Cl.⁵ .............................. G02B 5/14; G02B 5/16
[52] U.S. Cl. .................................... 385/105; 264/1.5; 124/108
[58] Field of Search ............... 350/96.23; 264/1.1, 264/1.5; 174/70, 106, 108; 57/216, 218, 234; 138/130, 131

[56] References Cited

U.S. PATENT DOCUMENTS

| | | | |
|---|---|---|---|
| 2,335,644 | 11/1943 | Camp | 57/234 |
| 2,770,940 | 11/1956 | Morrisa et al. | 57/234 |
| 4,072,398 | 2/1978 | Larsen et al. | |
| 4,097,119 | 6/1978 | Kumamaru et al. | |
| 4,110,001 | 8/1978 | Olszewski et al. | |
| 4,146,302 | 3/1979 | Jachimowicz | |
| 4,154,783 | 5/1979 | Jackson | |
| 4,155,963 | 5/1979 | de Vecchis et al. | |
| 4,156,104 | 5/1979 | Mondello | |
| 4,160,872 | 7/1979 | Lundberg et al. | |
| 4,183,200 | 1/1980 | Bajag | 57/234 |
| 4,199,224 | 4/1980 | Oestreich | |
| 4,239,336 | 12/1980 | Parfree et al. | |
| 4,269,024 | 5/1981 | Ashpole et al. | 57/234 |
| 4,278,835 | 7/1981 | Jackson | |
| 4,317,000 | 2/1982 | Ferer | |
| 4,324,575 | 4/1982 | Levy | |
| 4,341,440 | 7/1982 | Trezeguet et al. | |
| 4,359,598 | 11/1982 | Dey et al. | |
| 4,371,234 | 2/1983 | Parfree et al. | |
| 4,391,088 | 7/1983 | Salsby et al. | 57/234 |
| 4,441,787 | 4/1984 | Lichtenberger | 350/96.23 |
| 4,505,541 | 3/1985 | Considine et al. | 350/96.23 |
| 4,514,036 | 4/1985 | McDonald | 350/96.23 |
| 4,514,037 | 4/1985 | Bishop et al. | 350/96.23 |
| 4,522,465 | 6/1985 | Bishop et al. | 350/96.23 |
| 4,552,433 | 11/1985 | Titchmersh et al. | 350/96.23 |

FOREIGN PATENT DOCUMENTS

| | | |
|---|---|---|
| 2029048A | 3/1980 | United Kingdom . |
| 2060929 | 5/1981 | United Kingdom ............. 350/96.23 |
| 2105865 | 7/1981 | United Kingdom ............. 350/96.23 |
| 2085187A | 4/1982 | United Kingdom . |

OTHER PUBLICATIONS

G. A. Wilkins, "Fiber Optic Cables for Undersea Communications", Jan. 1977, p. 39–60, Fiber Integrated Optics, vol. 1, #1.

Bochave et al., "Surface Tension . . . Optical Fibers", Sep. 19, 1979, pp. 5.5/1-4, Proc. Opt. Comm. Conf. Netherlands, abst.

Yamamoto et al, "Design and Test Results . . . Optical Submarine Cable", Nov. 17, 1983, pp. 220–227, Proc. Inter. Wire & Cable Symp., New Jersey, USA, abst.

Kojima et al; Submarine Optical Fiber Cable: Development and Laying Results; vol. 21, No. 5, pp. 815–821; Published Mar. 1, 1984.

*Primary Examiner*—Nelson Moskowitz
*Attorney, Agent, or Firm*—Kerkam, Stowell, Kondracki & Clarke

[57] ABSTRACT

A subminiature fiber optic submarine cable uses a single layer of stainless steel wires around the optical fiber buffer of a single optical fiber in order to protect the fiber. A polymer adhesive filler material is used to bond the wires to the outside of the optical fiber buffer, whereas an ultraviolet curable polymer portion is disposed around the wires. The filler material used to fill the gaps between the wires and the optical fiber buffer is the same material as used for the outer polymer portion. The method of making the cable includes the application of adhesive filler material to an optical fiber buffer with a catalyst and helically winding stainless steel wires around the buffer. The structure is then passed through a coating cup which coats the wires with an outer polymer portion of ultraviolet curable material. Ultraviolet lamps then are used to cure the outer polymer portion.

15 Claims, 2 Drawing Sheets

SUBMINIATURE FIBER OPTIC SUBMARINE CABLE AND METHOD OF MAKING

BACKGROUND OF THE INVENTION

This invention relates to optical fiber submarine cable and a method of making an optical fiber submarine cable.

As used herein, "submarine cable" means underwater cable even if it is not used in a submarine detection systems.

When detecting submarines by use of sonobuoys, it is desirable to lay long lengths of fiber optic data transmission cable in the deep ocean. The use of special cable laying ships to lay the cable is often impractical in that an adversary or potential adversary may easily detect the laying of the cable. Other vehicles such as aircraft, ordinary ships (i.e., ships which are not easily discerned as including cable laying equipment), or submarines are highly preferred in laying the cable between the submarine-detecting sonobuoys. Long lengths of fiber optic data transmission cable including single optical fiber cables may be laid into the deep ocean for other purposes.

The long cable lengths and the avoidance of detection of the cable both require that the cable be of a very small diameter. Light weight and high information bandwidth are also required. In addition, the cable must have certain characteristics to render it suitable for use on the ocean bottom. In order to span chasms reliably, the fiber optic cable must have a high longitudinal stiffness (tensile modulus) as well as a high sink rate. The high or fast sink rate prevents ocean currents from disrupting the cable position during deployment of the cable.

An efficient submarine detection system may require thousands of kilometers of cable. Therefore, low attenuation, inexpensive, simply designed cable is desirable. The low attenuation characteristic is quite desirable in that it allows for wide spacing between different repeater stations.

Some previous optical fiber submarine cables have used a hermetic tube to surround and enclose the optical fibers. The tube prevents moisture from weakening the fiber. The hermetic tube additionally prevents pressure from causing microbending of the fiber which will in turn attenuate or weaken the optical signal. In some submarine cables, the tube is made of highly conductive copper or aluminum and serves to supply electrical power to optical repeaters spaced along the cable. When the tube is made of conductive material, it is enclosed within electrical insulation to insulate it from the water.

The use of a tube with the cable is quite costly. Additionally, the tube may take on a permanent elongation following the application of tension. This permanent elongation may cause residual stress to be applied to the optical fibers inside of the tube, thereby greatly decreasing their life expectancy. Moreover, the tube may be prone to cracking or necking down (decrease in diameter due to axial stretching). Either of these may cause strain on the optical fibers within the tube. The use of a continuous metal tube is also limited by high equipment costs as well as the low yield strength limitation inherent in the tube forming process. Strengthening requires expensive multi-step processing.

The cable need not be hermetically sealed by a tube. If the cable is kept at low strain, not in excess of 25% of proof test, the presence of water outside the fiber optic buffer will not reduce lifetime of the cable below acceptable levels.

Various previous design approaches have heretofore been used, but have been deficient in their ability to simultaneously control tensile modulus, mass, diameter, attenuation, and cost.

The use of a "pultruded" fiberglass protection for optical fibers entails the disadvantages of high cost, low tensile modulus of glass, and the tendency towards longitudinal cracking.

The use of polyethylene extrusion with embedded wires is limited by high equipment cost and low content of steel wire resulting in low tensile modulus.

The following U.S. patents show various designs which have heretofore been used for cables:

| U.S. Pat. No. | Inventor | Issue Date |
| --- | --- | --- |
| 4,072,398 | Larsen et al. | Feb. 7, 1978 |
| 4,097,119 | Kumamaru et al. | Jun. 27, 1978 |
| 4,110,001 | Olszewski et al. | Aug. 29, 1978 |
| 4,146,302 | Jachimowicz | Mar. 27, 1979 |
| 4,154,783 | Jackson | May 15, 1979 |
| 4,155,963 | de Vecchis et al. | May 22, 1979 |
| 4,156,104 | Modello | May 22, 1979 |
| 4,160,872 | Lundberg et al. | Jul. 10, 1979 |
| 4,199,224 | Oestreich | Apr. 22, 1980 |
| 4,239,336 | Parfree et al. | Dec. 16, 1980 |
| 4,278,835 | Jackson | Jul. 14, 1981 |
| 4,317,000 | Ferer | Feb. 23, 1982 |
| 4,324,575 | Levy | Apr. 13, 1982 |
| 4,341,440 | Trezeguet et al. | Jul. 27, 1982 |
| 4,359,598 | Dey et al. | Nov. 16, 1982 |
| 4,371,234 | Parfree et al. | Feb. 1, 1983 |

The Larsen et al. patent discloses a communication cable using optical fibers and an outer coating. The optical fibers are loosely twisted together and provided with tension-relieving wires and sheathed to form a cable with interspaces filled with lubricants.

The Kumamaru et al. patent shows an optical fiber cable using cushioning layers made of nonwoven plastic fabric or foamed plastic. An outer sheathed layer made of a composite of metal and plastic is also used.

The Olszewski et al. patent discloses an optical fiber cable construction including a seam welded metalic tube to protect the optical fiber. The optical fiber is placed within a helical channel in a core element.

The Jachimowicz patent discloses an optical fiber cable having optical fibers helically wound within a welded metal tube. When the cable is stretched, the fibers remain relaxed due to their helical construction.

The Jackson U.S. Pat. No. '783 shows a cable with optical fibers inside two concentric tubes and having steel wires wrapped around the outer tube (aluminum water barrier) in two oppositely wound layers.

The de Vecchis et al. patent shows different methods of making optical fibers and including various extrusion steps.

The Mondello patent discloses a submarine cable including optical fibers and cable strength members including a central filament and layers of stranded steel wires separated from the central filament by an insulating core member. A metallic tube surrounds the layers of stranded steel wire and provides a DC path for powering optical repeaters and a hermetic moisture-barrier for the fiber.

The Lundberg et al. patent discloses a floating cable system including a metallic protective layer around inner electrical conductors.

The Oestreich patent discloses an optical fiber cable including helical extending chambers in which the optical fibers are disposed. Additionally, an apparatus for constructing the cable is disclosed.

The Parfree et al. U.S. Pat. No. '336 shows an optical fiber communication cable including optical fibers within a copper tube. A plastic layer surrounds the copper tube and strength members are disposed around the plastic layer. An outer sheath surrounds the strength members.

The Jackson U.S. Pat. No. '835 shows an optical fiber submarine cable wherein the optical fibers are disposed in petroleum jelly within a copper or aluminum tube. Polycarbonate surrounds the tube and in turn is surrounded by an aluminum water barrier. Inner and outer layers of steel wires are wound in opposite directions around the aluminum water barrier. Mylar tape and polyethylene layers surround the outer wire layers. The inner and outer wires press against each other and against the aluminum water barrier to make the cable rigid when it is under hydrostatic pressure.

The Ferer patent discloses a cable including a plurality of electrically conductive wires or a bundle of optical fibers surrounded by an extrusion of plastic. An inner layer of KEVLAR fiber strands surrounds the plastic and is oppositely wound from an outer helical layer of KEVLAR and nylon fiber strands, separated from the inner layer by a thin plastic film. A braided outer jacket or covering surrounds the outer layer.

The Levy patent discloses the use of ultraviolet cured polymer to coat an optical fiber.

The Trezeguet et al. patent discloses a submarine optical fiber cable including a drawn copper tube having a longitudinal weld and surrounding the optical fibers. Liquid is disposed within the tube, whereas its outside is surrounded by a polyolefin outer sheath, for example polyethylene.

The Dey et al. patent shows an overhead electric transmission system including an optical fiber or optical fiber bundle. Different layers of wires surround a core in which the optical fibers are disposed. Adjacent layers of wires are wound in opposite directions.

The Parfree et al. U.S. Pat. No. '234 discloses a submarine optical fiber cable including optical fiber within an aluminum tube surrounded by an inner layer of armouring wires and a polyetheylene layer. This in turn is surrounded by an additional layer of low density polyethylene having a bedding material such as jute or polypropylene fibers around it. Just outside the jute or polypropylene fiber layer are outer steel armor wires followed by an additional layer of jute or polypropylene fibers.

The following documents disclose various other cable designs:

| Document | Publication Date |
| --- | --- |
| UK Patent Appln. 2,085,187A | April 21, 1982 |
| UK Patent Appln. 2,029,048A | March 12, 1980 |
| "Submarine Optical Fiber Cable: Development and Laying Results" by Kojima et al - in APPLIED OPTICS, Vol. 21, No. 5, pgs. 815-821. | March 1, 1984 |

The UK published patent application 2,029,048A discloses an optical fiber submarine cable including a power supplying and pressure resisting layer which may be formed from a tape-like material into a pipe-like configuration. Tension resisting wires are wound around the power supplying pressure resisting layer and in turn are surrounded by insulation. An outer sheath surrounds the insulation. The wire layer is used as a surge attenuator since it is made of lower conductivity material than the power supplying layer.

UK patent application 2,085,187A discloses an optical fiber cable construction including one or more optical fibers disposed within a conductive tube and surrounded by reinforcing elements. The reinforcing helically wound elements are in turn surrounded by conductive elements wound in the opposite direction.

The magazine article "Submarine Optical Fiber Cable: Development and Laying Results" discloses various design criteria for submarine optical fiber cable. Additionally, it shows a torqueless armoring structure wherein a cable core is surrounded by inner and outer armoring layers of oppositely wound wires.

OBJECTS AND SUMMARY OF THE INVENTION

Accordingly, it is a primary object of the present invention to provide a new and improved submarine optical fiber cable.

A further object of the present invention is to provide a new and improved method of making submarine optical fiber cable.

A more specific object of the present invention is to provide a submarine optical fiber cable having a relatively small diameter and weight of the cable for a given strength.

Another object of the present invention is to provide a submarine optical fiber cable which maintains its cost of production low by avoiding the use of a tube and providing high running (production) speed and low capital equipment cost.

A further object of the present invention is to provide a fiber optic submarine cable with a high sink rate, good longitudinal stiffness (tensile modulus), good lifetime expectancy, and resistance to microbending.

The above and other objects of the present invention which will become apparent as the description proceeds are realized by a subminiature fiber optic submarine cable comprising: an optical fiber surrounded by an optical fiber buffer having an outer surface; a plurality of metal wires helically wound at the outer surface at a helix angle of 10 degrees or less and adhesively bonded about the outer surface, the wires extending in only a single layer; curable filler material in the gaps between the outer surface and the wires and between adjacent wires; and an outer polymer portion of ultraviolet curable polymer extending around the wires and from the wires radially outward to an external surface. The filler material sufficiently fills the gaps such that the geometrical fill factor interior to the wires is 99% or greater. The fill material is adhesive. The wires have a helix angle of preferably between 2.7 degrees and 6.0 degrees. More preferably, the helix angle is 3 degrees plus or minus 10%. The wires consist essentially of stainless steel. The filler material and the outer polymer portion both are acrylics. The optical fiber is the only optical fiber within the cable. The optical fiber can be hermetically sealed. The cable is tubeless. The cable is circular in cross-section and has a diameter no greater than 2.0 mm. The optical fiber buffer has a circular cross-section and there are 6 wires each of which has a diameter within 10% of the diameter of the optical fiber buffer. Up to 15 wires may be used if the wire size is chosen to produce a near 100% fill.

The method of making a subminiature fiber optic submarine cable according to the present invention comprises the steps of: letting out an optical fiber surrounded by an optical fiber buffer having an outer surface; applying a curable adhesive material to the outer surface; helically winding a plurality of metal wires around the outer surface at a helix angle of 10 degrees or less such that the filler material adheres the wires to the outer surface and fills gaps between the outer surface and the wires and between adjacent wires; applying an outer polymer portion of ultraviolet curable polymer around the wires and radially outward to an external surface; and subjecting the outer polymer portion to ultraviolet light to cure the outer polymer portion. The filler material is applied with a catalyst or is anaerobic curing. The cable is tubeless. The filler material and outer polymer portion are both acrylics. The optical fiber buffer has a circular cross-section and the wires include 6 wires each of which has a diameter within 10% of the diameter of the optical fiber buffer and up to 15 wires may be used if the wire size is chosen to produce a near 100% fill. The wires have a helix angle of most preferably 3 degrees plus/minus 10%. The wires consist essentially of stainless steel.

BRIEF DESCRIPTION OF THE DRAWINGS

The above and other features of the present invention will be more readily understood when the following detailed description is considered in conjunction with the accompanying drawings wherein like characters represent like parts throughout the several view and in which.

DETAILED DESCRIPTION

Figure 2:
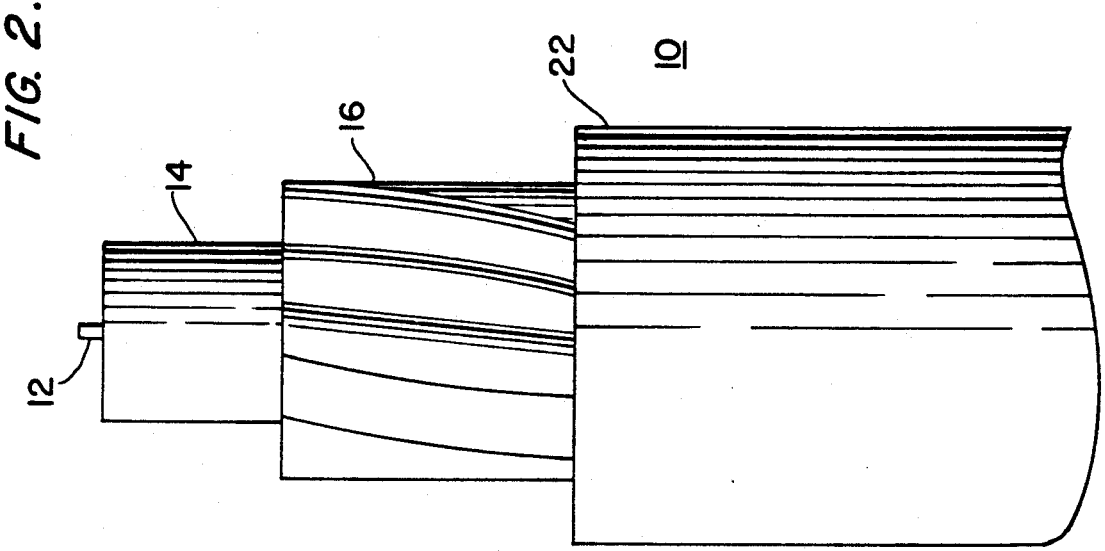
FIG. 2 represents a side view with parts broken away of the embodiment of FIG. 1.
Figure 1:
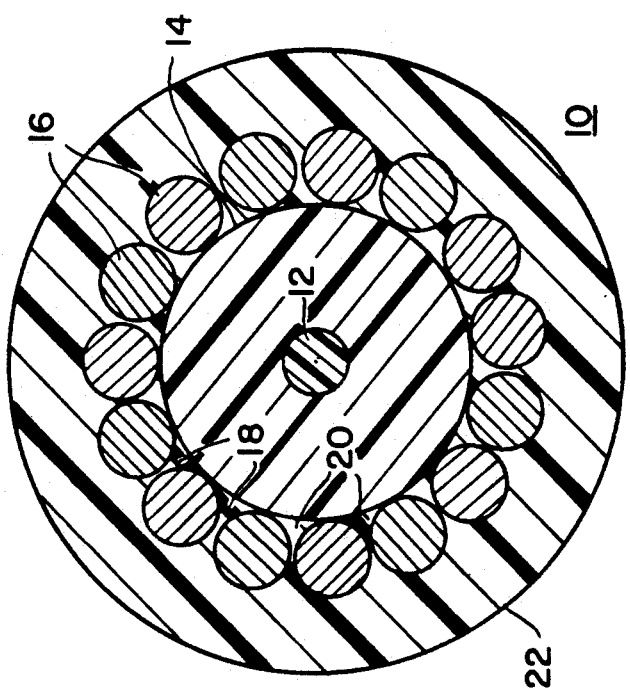
FIG. 1 represents a cross-section view of a first embodiment of the present invention.

A cable 10 according to the present invention is shown in FIGS. 1 and 2. In particular, FIG. 1 shows a cross-sectional view taken in a plane perpendicular to the axis of the generally cylindrical cable 10, whereas FIG. 2 shows a side view with parts of the cable broken away to illustrate the relative position of the parts.

The cable 10 includes an optical fiber 12 centrally disposed within the cable 10. The optical fiber 12, which preferably has an outer diameter of 0.125 millimeters, would of course include a core and cladding. The core and cladding of fiber 12 are shown as one because they are usually fused together such that they appear as one. Optical fiber buffer 14 coaxially surrounds the fiber 12 and preferably has an outer diameter of 0.25 to 0.50 millimeters. Disposed around the outer surface of optical fiber buffer 14 are a plurality of metal wires 16. The wires 16 are made of stainless steel so as to resist corrosion. The wires 16 are helically wound in only a single layer around the outer surface of optical fiber buffer 14 to define a number of gaps 18 in between the wires 16 and the outer surface of buffer 14 and in between adjacent ones of the wires 16. Importantly, the gaps 18 are filled with a curable filler material 20. The filler material 20 sufficiently fills the voids or gaps 18 such that the geometrical fill factor interior to the single layer of wires 16 coaxially arranged around optical fiber 12 is 99% or greater. Another cable perameter is the geometrical fill factor of the armor layer. This is the percent of fill of space in an imaginary cylinder located at the pitch diameter of the armor wires. Thus at 100% fill factor, the armor wires just all touch each other. The filler material 20 is adhesive and may comprise the same material which makes up an outer polymer portion 22 which is disposed coaxially around the wires 16 and the single optical fiber 12 within the cable 10. Alternately, different acrylics may be used as discussed below.

The wires 16 have a helix angle of 10 degrees or less, it being noted that greater angles generally would require preforming of the wires to prevent them from straightening out. More preferably, the wires 16 have a helix angle of between 2.7 degrees and 6.0 degrees. Even more specifically, the wires 16 will function best with a helix angle of 3 degrees plus/minus 10%. Use of lower angles for the wires 16 makes it difficult to have the wires grip the outer surface of buffer 14 until the adhesive filler material 20 has taken hold.

As shown in FIG. 1, 15 of the wires 16 are disposed at the outer surface of the buffer 14. The stainless steel wires 16 (preferably type 316 wires) are not used for electrical conduction, but instead are used as strength members in a cage-like geometry in order to protect the fiber 12 from tensile and compressive forces. The high mass of the steel would not exceed 3 kilograms/kilometer if 0.5 millimeter or smaller buffered fiber is used.

The outer polymer portion 22 is made of an ultraviolet curable polymer which is abrasion resistant and has an outer diameter of 1.17 millimeters. A suggested ultraviolet curable polymer has 4,000 pounds per square inch of tensile strength, 98% elongation, and a 2.5 Tukon hardness factor is made by De Soto, Inc. of Des Plaines, Ill. Specifically, the product is sold under the name DESOLITE ET (no. 3380-78), which is an extra tough protective buffer having UV curable adhesive containing multifunctional acrylate monomers. As shown, polymer portion 22 extends continuously (i.e., no intervening material or members) from the wires 16 to the external surface of cable 10.

The filler material 20 is an adhesive material, such as UV-curable IMPROVE 365 sold by Loctite Co. of Newington, Conn., and containing acrylic esters, but is cured using a catalyst as outlined below. Thus, both the filler and the outer portion 22 are acrylics and UV-curable material.

It will be readily appreciated that the embodiment of FIGS. 1 and 2 is a tubeless cable in that it does not include a metallic tube around the optical fiber 12. The fiber 12 need not be hermetically sealed and, thus, an expensive and heavy tube need not be used. If it is desired to hermetically seal the optical fiber, commercially available hermetically sealed optical fiber may be used instead of a tube. Such commercially available fibers use a deposition process to apply a thin barrier coating of chrome or other metal around the fiber.

Figure 3:
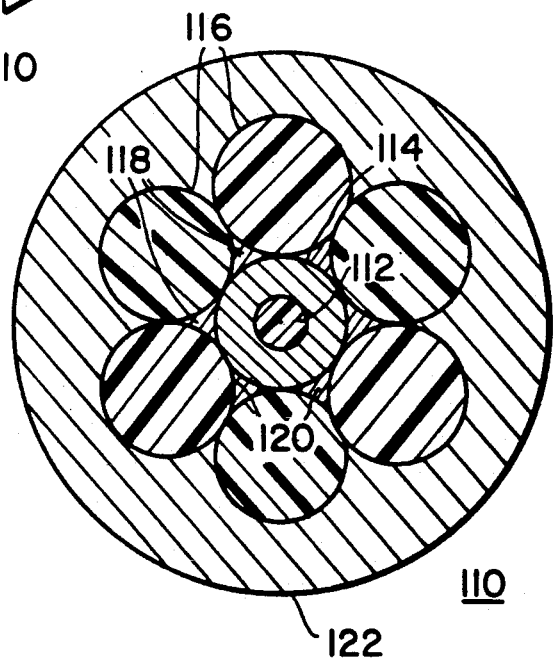
FIG. 3 shows an alternate embodiment of the present invention.

Turning now to FIG. 3, an alternate embodiment of the present invention will be discussed. FIG. 3 shows a cross-section taken perpendicular to an axis of the alternate embodiment cable 110 of the present invention. The parts of the cable 110 are labeled with the same last two digits as the corresponding part for cable 10 of FIGS. 1 and 2. Thus, optical fiber 112, fiber buffer 114, stainless steel wires 116, gaps 118, filler material 120, and outer polymer portion 122 are made of the same materials and function in the same manner as the corresponding parts of FIGS. 1 and 2. The embodiment of FIG. 3 is similar to the embodiment of FIGS. 1 and 2 except that there are only six of the wires 116 arranged in only a single layer around the optical fiber buffer 114 and the diameter of the wires 116 is preferably identical (and at least within 10%) of the diameter of the optical fiber buffer 114. The drawing of FIG. 3 is also useful in that it clearly distinguishes the filler material 120 from the outer polymer portion 122 by showing the wires 116 touching. Obviously, the filler material 120 may be more or less distinct from the outer portion 122 depending upon the distance between the wires 116. With even a slight separation between the wires 116, the filler material 120 may blend in to the outer polymer portion 122. The outer diameter of the FIG. 3 embodiment cable 110 (as well as cable 10) is no greater than 2.0 mm.

The use of the type 316 stainless steel wires for the wires 16 and 116 (instead of Kevlar or carbon) has the advantages of smoothness and lack of porosity. This in turn reduces the microbending or other problems, such as bubbling during cure.

Figure 4:
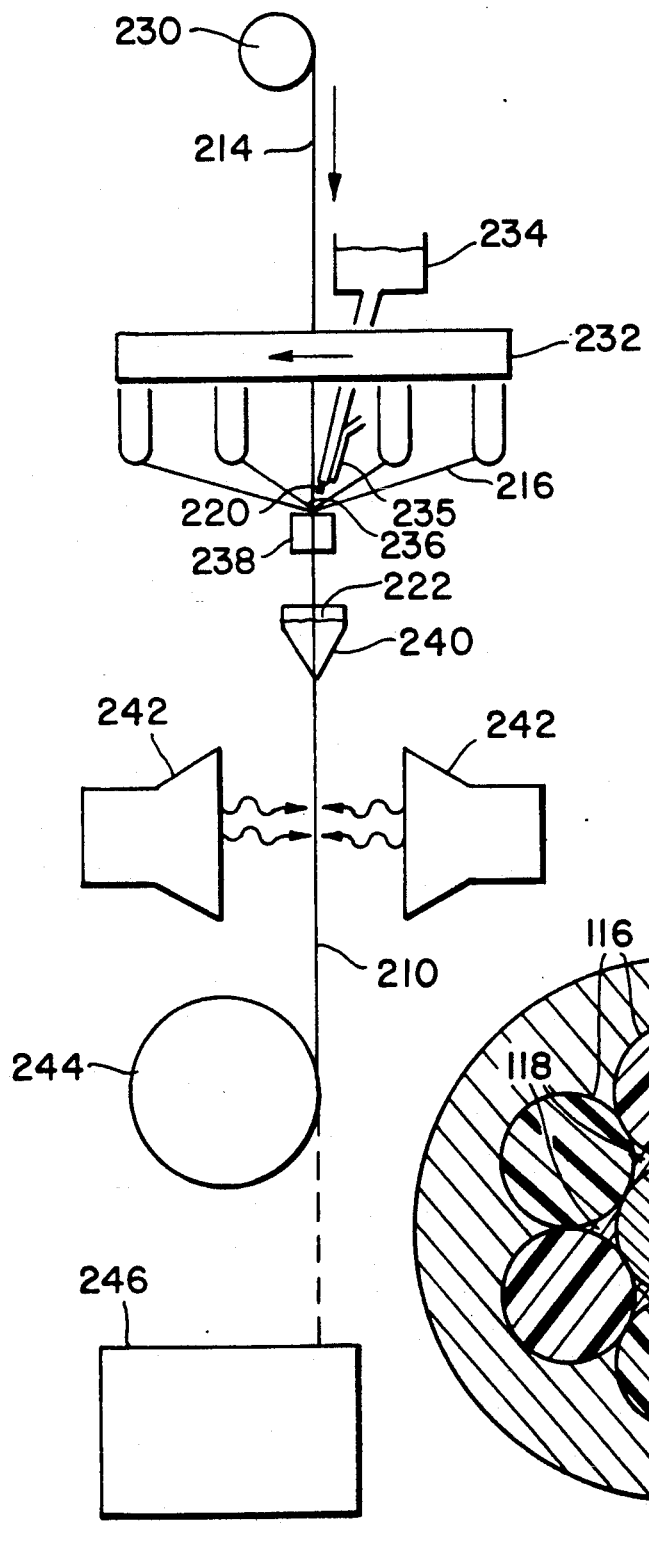
FIG. 4 shows a schematic of an assembly method according to the present invention.

Turning now to FIG. 4, the method of making the cable 10 (or 110) according to the present invention will be discussed in detail. FIG. 4 shows a schematic illustrating how the cable is made in a single pass through a group of synchronized machines. Single pass manufacturing is cost effective and reduces production time, speed of manufacture also being an important consideration. The parts in FIG. 4 are numbered in the "200" series with the same last two digits as the corresponding parts (if any) in FIGS. 1, 2, and 3.

The optical fiber including buffer 214 goes from the fiber optic let out 230 to the planetary 232. The planetary 232 operates at 400 revolutions per minute and uses 15 spools of 0.152 millimeter wire, type 316 stainless steel in order to make the cable 10 of FIGS. 1 and 2. (Obviously, the number of spools would be reduced to six for manufacturing the cable 110 of FIG. 3.) Coating cup 234 is filled with ultraviolet curable polymer 220 which is coated around the optical fiber buffer 214. The ultraviolet curable polymer 220 is either anaerobically curing or applied with a catalyst (from catalyst applicator 235) at point 236. The catalyst may be primer 707 from the above-identified Loctite Co.

Following the passage of the buffer 214 with wires 216 wrapped around it through the part 238 (which prevents the wire 216 from unraveling until the adhesive filler 120 has had time to cure by way of the catalyst). The coating cup 240 applies the polymer material 222 around the cable which then passes through the ultraviolet lamps 242 to cure the polymer material 222 such that it becomes the outer polymer portion 22 (embodiment of FIGS. 1 and 2) or 122 (FIG. 3 embodiment). The cable 210 then proceeds to the take-up reel 244. Alternately, the cable 210 could proceed to a production payout spool winder 246.

The steel wires arranged as described above might have had geometrical instability and resulting longitudinal adhesive cracking problems similar to hollow fiberglass poltrusions. These problems are mitigated by the use of the helix for the steel protector wires 16 or 16 and by the use of the coating of high strength ultraviolet cured polymer over the steel wires. This combination imparts adequate stability to the structure. Although the helical server 232 does limit the production line speed, readily available servers will accommodate a production speed of about 1,000 meters per hour.

Although various details of the preferred embodiments of the present invention have been discussed herein, it is to be understood that these are for illustrative purposes only. Various modifications and adaptations will be readily apparent to those of ordinary skill in the art. Accordingly, the scope of the present invention should be determined by reference to the claims appended hereto.

What is claimed is:

1. A Subminiature fiber optic submarine cable comprising:
   (a) an optical fiber surrounded by an optical fiber buffer having an outer surface;
   (b) a plurality of metal wires helically wound at said outer surface at a helix angle of 8.0 degrees or less and adhesively bonded about said outer surface, said wires extending in a single layer;
   (c) curable filler material in the gaps between said outer surface and said wires and between adjacent of said wires;
   (d) an outer polymer portion of ultraviolet curable polymer extending around said wires and from said wires radially outward to an external surface; wherein said fill material is adhesive;
   wherein said wires consist essentially of steel; and
   wherein said filler material and said outer polymer portion both comprise acrylics.

2. The subminiature fiber optic submarine cable of claim 1 wherein said filler material sufficiently fills said gaps such that the geometrical fill factor interior to said wires is 99% or greater.

3. The subminiature fiber optic submarine cable of claim 2 wherein said wires have a helix angle of between 2.7 degrees and 6.0 degrees.

4. The subminiature fiber optic submarine cable of claim 3 wherein said wires have a helix angle of 3 degrees plus/minus 10%.

5. The subminiature fiber optic submarine cable of claim 1 wherein said optical fiber is the only optical fiber in said cable.

6. The subminiature fiber optic submarine cable of claim 5 wherein said optical fiber is hermetically sealed.

7. The subminiature fiber optic submarine cable of claim 1 wherein said optical fiber is the only optical fiber in said cable.

8. The subminiature fiber optic submarine cable of claim 7 wherein said filler material sufficiently fills said gaps such that the geometrical fill factor interior to said wires approaches 100%.

9. The subminiature fiber optic submarine cable of claim 8 wherein said wires have a helix angle of 3 degrees plus/minus 10%, and wherein said wires consist essentially of stainless steel.

10. The subminiature fiber optic submarine cable of claim 1 wherein said cable is circular in cross-section and has a diameter no greater than 2.0 mm.

11. The subminiature fiber optic submarine cable of claim 1 wherein said optical fiber buffer has a circular cross-section and said wires comprise 6 wires each of which has a diameter within 10% of the diameter of said optical fiber buffer.

12. A method of making a subminiature fiber optic submarine cable the steps comprising:
(a) letting out an optical fiber surrounded by an optical fiber buffer having an outer surface;
(b) applying a curable adhesive material to said outer surface;
(c) helically winding a plurality of metal wires around said outer surface at a helix angle of 8.0 degrees or less such that said filler material adheres said wires to said outer surface and fills gaps between said outer surface and said wires between adjacent wires; wherein said filler material and said outer polymer portion both comprise acrylics.

13. The method of claim 12 wherein said filler material is applied with a catalyst.

14. The method of claim 12 wherein said optical fiber buffer has a circular cross-section and said wires include only six wires each of which has a diameter within 10% of the diameter of said optical fiber buffer.

15. The method of claim 12 wherein said wires have a helix angle of 3 degrees plus/minus 10% and wherein said wires consist essentially of stainless steel.

* * * * *